(12) United States Patent
Helbig et al.

(10) Patent No.: US 9,310,057 B2
(45) Date of Patent: Apr. 12, 2016

(54) LIGHTING APPARATUS

(75) Inventors: Philipp Helbig, Heidenheim (DE);
Oliver Hering, Niederstotzingen (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 13/995,964

(22) PCT Filed: Dec. 6, 2011

(86) PCT No.: PCT/EP2011/071852
§ 371 (c)(1),
(2), (4) Date: Jul. 2, 2013

(87) PCT Pub. No.: WO2012/084481
PCT Pub. Date: Jun. 28, 2012

(65) Prior Publication Data
US 2013/0265793 A1    Oct. 10, 2013

(30) Foreign Application Priority Data

Dec. 21, 2010 (DE) .......................... 10 2010 063 713

(51) Int. Cl.
*B60Q 1/00* (2006.01)
*F21V 21/00* (2006.01)
(Continued)

(52) U.S. Cl.
CPC ............. *F21V 21/00* (2013.01); *F21S 48/1104* (2013.01); *F21S 48/115* (2013.01); *F21S 48/1109* (2013.01); *F21S 48/1154* (2013.01); *F21S 48/1159* (2013.01); *F21S 48/1241* (2013.01);
(Continued)

(58) Field of Classification Search
CPC  F21S 48/1159; F21S 48/1195; F21S 48/1241

USPC .......... 362/545, 231, 511, 543, 544, 547, 548
See application file for complete search history.

(56) References Cited

U.S. PATENT DOCUMENTS 6,650,058 B1 * 11/2003 Wang .............................. 315/82
6,789,929 B1 *  9/2004 Doong et al. ................ 362/511
(Continued)

FOREIGN PATENT DOCUMENTS

CN         1824993 A      8/2006
CN       101315177 A     12/2008
(Continued)

OTHER PUBLICATIONS

English language abstract of DE 102008013604A1 of Sep. 17, 2009.
(Continued)

*Primary Examiner* — Elmito Breval
*Assistant Examiner* — Matthew Peerce
(74) *Attorney, Agent, or Firm* — Viering,Jentschura&Partner mbB

(57) ABSTRACT

A lighting apparatus includes semiconductor light sources and a heat sink for the semiconductor light sources, wherein the lighting apparatus has a carrier element for at least one first group and one second group of luminous elements, said carrier element being connected to the heat sink and projecting from a side of the heat sink, and wherein the first group and second group of luminous elements are arranged on surface regions of the carrier element and in each case comprise at least one semiconductor light source, wherein a further group of luminous elements is arranged at the side of the heat sink from which the carrier element projects, and the further group of luminous elements comprises at least one semiconductor light source.

13 Claims, 11 Drawing Sheets

(51) Int. Cl.
*F21S 8/10* (2006.01)
*F21V 7/06* (2006.01)
*F21V 8/00* (2006.01)
*F21V 29/70* (2015.01)
*F21K 99/00* (2010.01)
*F21V 7/00* (2006.01)
*F21V 29/00* (2015.01)
*F21Y 101/02* (2006.01)
*F21Y 113/00* (2006.01)
*F21Y 113/02* (2006.01)

(52) U.S. Cl.
CPC . *F21V 7/06* (2013.01); *F21V 29/70* (2015.01); *G02B 6/0001* (2013.01); *F21K 9/30* (2013.01); *F21S 48/328* (2013.01); *F21V 7/0008* (2013.01); *F21V 29/004* (2013.01); *F21V 29/2212* (2013.01); *F21Y 2101/02* (2013.01); *F21Y 2113/00* (2013.01); *F21Y 2113/02* (2013.01)

(56) References Cited

U.S. PATENT DOCUMENTS

| | | | |
|---|---|---|---|
| 7,008,096 | B1 | 3/2006 | Coushaine et al. |
| 7,156,544 | B2* | 1/2007 | Ishida ............ 362/538 |
| 7,158,019 | B2* | 1/2007 | Smith ............ 340/467 |
| 7,207,695 | B2* | 4/2007 | Coushaine et al. ...... 362/240 |
| 7,237,936 | B1 | 7/2007 | Gibson |
| 7,413,326 | B2* | 8/2008 | Tain ............ F21K 9/00 362/294 |
| 7,794,128 | B2 | 9/2010 | Fujiwara et al. |
| 7,824,076 | B2* | 11/2010 | Koester ............ 362/294 |
| 7,982,403 | B2 | 7/2011 | Hohl-AbiChedid et al. |
| 8,100,557 | B2* | 1/2012 | Chen et al. ............ 362/249.02 |
| 8,186,849 | B2 | 5/2012 | Helbig et al. |
| 8,292,479 | B2* | 10/2012 | Sazuka et al. ............ 362/511 |
| 8,436,517 | B2* | 5/2013 | Oki ............ 313/46 |
| 8,833,990 | B2* | 9/2014 | Tessnow et al. ............ 362/507 |
| 2003/0063476 | A1* | 4/2003 | English et al. ............ 362/545 |
| 2004/0120160 | A1* | 6/2004 | Natsume ............ B60Q 1/0058 362/544 |
| 2006/0028814 | A1 | 2/2006 | Smith |
| 2007/0080645 | A1 | 4/2007 | Smith |
| 2008/0212325 | A1* | 9/2008 | Wang ............ F21V 29/004 362/294 |
| 2009/0002997 | A1 | 1/2009 | Koester |
| 2010/0060127 | A1 | 3/2010 | Sazuka et al. |
| 2010/0135037 | A1* | 6/2010 | Tsukamoto ............ 362/538 |
| 2010/0165562 | A1 | 7/2010 | Segaram |
| 2011/0075431 | A1* | 3/2011 | Wu ............ 362/373 |
| 2011/0310603 | A1* | 12/2011 | Simons ............ 362/235 |

FOREIGN PATENT DOCUMENTS

| | | |
|---|---|---|
| DE | 202005007501 U1 | 9/2005 |
| DE | 102004046389 A1 | 4/2006 |
| DE | 102005049685 A1 | 4/2007 |
| DE | 102006003470 A1 | 8/2007 |
| DE | 102007019115 A1 | 11/2007 |
| DE | 102007041817 A1 | 3/2009 |
| DE | 102008013604 A1 | 9/2009 |
| DE | 102008013921 A1 | 9/2009 |
| DE | 102008025748 A1 | 12/2009 |
| DE | 202010002406 U1 | 6/2010 |
| EP | 1696172 A1 | 8/2006 |
| EP | 1762775 A1 | 3/2007 |
| JP | 2006092922 A | 4/2006 |
| WO | 2006032662 A1 | 3/2006 |

OTHER PUBLICATIONS

English language abstract of DE 102008013921A1 of Sep. 17, 2009.
English language abstract of DE 102008025748A1 of Dec. 3, 2009.
English language abstract of JP 2006092922 of Apr. 6, 2006.
English language abstract of DE 202005007501U1 of Sep. 22, 2005.
English language abstract of DE 102006003470A1 of Aug. 9, 2007.
English language abstract of EP 1762775A1 of Mar. 14, 2007.
Chinese Office Action received for parallel Chinese Application No. 2011800658133 dated Nov. 3, 2014 and English translation.

\* cited by examiner

LIGHTING APPARATUS

RELATED APPLICATIONS

The present application is a national stage entry according to 35 U.S.C. §371 of PCT application No.: PCT/EP2011/071852 filed on Dec. 6, 2011, which claims priority from German application No.: 10 2010 063 713.0 filed on Dec. 21, 2010.

TECHNICAL FIELD

Various embodiments relate to a lighting apparatus. What is concerned, in particular, is a lighting apparatus which is provided as part of headlights for vehicles or is embodied as a vehicle headlight.

BACKGROUND

EP 1 762 775 A1 discloses a lighting apparatus having semi-conductor light sources which are arranged on surface regions of a carrier element which face away from one another, reflectors being assigned to said semiconductor light sources.

SUMMARY

Various embodiments provide a lighting apparatus which is provided with semiconductor light sources and with the aid of which at least three different lighting functions can be realized in a vehicle in the simplest possible manner.

The lighting apparatus according to various embodiments has semiconductor light sources and a heat sink for the semiconductor light sources and also a carrier element—connected to the heat sink—for at least one first group and one second group of luminous elements, wherein the carrier element projects from a side of the heat sink and the first group and second group of luminous elements are arranged on surface regions of the carrier element and in each case include at least one semiconductor light source. According to various embodiments, the lighting apparatus has at least one further group of luminous elements which is arranged at the side of the heat sink from which the carrier element projects and which includes at least one semiconductor light source. As a result, at least three different lighting functions can be realized by means of the lighting apparatus according to various embodiments. By way of example, the first group of luminous elements can be used for generating the low-beam light, the second group of luminous elements can be used for generating the high-beam light, and the further group of luminous elements can be used for generating the daytime running light and position light. Alternatively or additionally, the at least one further group of luminous elements can also be used for generating a static or dynamic cornering light or the flashing light of a travel direction indicator. Moreover, the luminous elements or the semiconductor light sources of the first and second groups and also of the at least one further group of luminous elements of the lighting apparatus according to various embodiments can be cooled by a single, common heat sink. Furthermore, a common electronic unit for operating the semiconductor light sources of all groups of luminous elements can be provided, which is arranged for example on a mounting circuit board within or on the heat sink. As a result, the heat generated by the abovementioned electronic unit is likewise dissipated to the surroundings via the heat sink. Overall, this makes possible a space-saving and cost-effective lighting apparatus.

On the carrier element of the lighting apparatus according to various embodiments, besides the first and second groups of luminous elements, additional groups of luminous elements may also be arranged as well, in order to make possible additional lighting functions.

In this patent application, the term "semiconductor light sources" denotes light-emitting diodes and laser diodes which, depending on the lighting function, generate white or colored light or infrared radiation. In particular, the term "semiconductor light sources" also encompasses light-emitting diodes and laser diodes which generate ultraviolet radiation that is converted into white or colored light by means of phosphors.

In this patent application, the term luminous elements denotes either the abovementioned semiconductor light sources or a combination of said semiconductor light sources with optical waveguides coupled thereto, from which the light generated by the semiconductor light sources emerges.

In the case of the lighting apparatus according to various embodiments, the surface regions of the carrier element on which the first and second groups of luminous elements are arranged are advantageously shaded relative to one another or face away from one another, such that no light emitted directly by the luminous elements of the first group of luminous elements is incident on the luminous elements of the second group of luminous elements, and vice versa. As a result, the luminous elements of the first and second groups of luminous elements may be assigned different reflector sections or reflector shells of a reflector, in order to be able to generate different lighting functions having a different light distribution by means of the first and second groups of luminous elements. Preferably, for this purpose, the surface regions of the carrier element on which the first and second groups of luminous elements are arranged lie on opposite sides of the carrier element. That is to say that the abovementioned surface regions of the carrier element on which the first and second groups of luminous elements are arranged lie on the front side and rear side or the left and right sides or the top side and underside of the carrier element.

The luminous elements of the further group of luminous elements of the lighting apparatus according to various embodiments are advantageously arranged along an axis extending perpendicular to a fictitious connecting axis of the opposite sides of the carrier element on whose surface regions the first group and second group of luminous elements are arranged. As a result, a gap or interspace between the reflector sections or reflector shells which are assigned to luminous elements of the first and second groups of luminous elements can be used for the light emission of the luminous elements of the further group of luminous elements, in order to realize further lighting functions. Preferably, for this purpose, the luminous elements of the further group of luminous elements are arranged in a strip-shaped region which runs perpendicular to the abovementioned fictitious connecting axis on both sides of the carrier element and whose width corresponds to the corresponding transverse dimension of the carrier element.

In accordance with one preferred exemplary embodiment of various embodiments, the further group of luminous elements is arranged on the surface of that side of the heat sink from which the carrier element projects. This results in a simple mounting of the further group of luminous elements and a good thermal coupling between the luminous elements of the further group of luminous elements and the heat sink. Preferably, for this purpose, even the semiconductor light sources of the further group of luminous means are arranged on the surface of that side of the heat sink from which the carrier element projects.

Alternatively, however, it is also possible that only the light-emitting ends of optical waveguides which are optically coupled to the at least one semiconductor light source of the further group of luminous elements are arranged in or on the surface of that side of the heat sink from which the carrier element projects. The at least one semiconductor light source of the further group of luminous elements may then be arranged at any desired location. This alternative is illustrated schematically in FIG. 10.

In accordance with another preferred exemplary embodiment, the further group of luminous elements is arranged within the heat sink opposite or in the region of at least one perforation in a surface of that side of the heat sink from which the carrier element projects. As a result, the semiconductor light sources of the further group of luminous elements, for example jointly with an electronic unit serving for operating them, can be arranged on a mounting circuit board within the heat sink. Via the mounting circuit board, the abovementioned semiconductor light sources can easily be mounted and electrically contact-connected. Moreover, a good thermal coupling to the heat sink can also be performed via the mounting circuit board.

In accordance with a further preferred exemplary embodiment, the luminous elements of the further group of luminous elements are arranged in such a way that their main emission direction forms an angle of greater than zero degrees with the surface normal to the surface of the side of the heat sink from which the carrier element projects. The abovementioned main emission direction is defined by the cone axis of the light cone of the light emitted by the respective luminous element. The term "surface normal" denotes in the mathematical sense the normal vector of the surface of that side of the heat sink from which the carrier element projects. The abovementioned orientation of the main emission direction of the luminous elements of the further group of luminous elements makes it possible to realize, for example, the lighting functions of cornering light and flashing light for travel direction indicators.

Advantageously, the further group of luminous elements has at least one optical element which is optically coupled to the at least one semiconductor light source of the further group of luminous elements. As a result, the light distribution of the light emitted by the further group of luminous elements may be adapted to the desired lighting function. By way of example, a common optical element can be provided for all or a plurality of the semiconductor light sources of the further group of luminous elements or each semiconductor light source of the further group of luminous elements may have a dedicated, separate optical element into which the light generated by the semiconductor light source is coupled.

In accordance with one preferred exemplary embodiment, the at least one optical element mentioned above is an optical waveguide. As a result, by means of the shape of the optical waveguide, in addition to the light guiding, it is also possible to take account of specific design desires in the realization of daytime running light and position light functions. Alternatively, however, the at least one optical element may also be an optical lens or a reflector or reflector segment.

In accordance with another preferred exemplary embodiment, the at least one optical element forms a cover for the at least one perforation in the surface of that side of the heat sink from which the carrier element projects. As a result, the semiconductor light sources of the further group of luminous elements that are arranged within the heat sink are protected and the mounting of the at least one optical element is simplified, since it can be fixed to the edge of the at least one perforation. Preferably, therefore, the at least one optical element is accommodated with the at least one perforation with an exact fit.

Advantageously, an electronic unit for operating the semiconductor light sources of the first group, second group and further group of luminous elements and preferably for operating all semiconductor light sources of the lighting apparatus according to various embodiments is accommodated within the heat sink of the lighting apparatus according to various embodiments. As a result, all semiconductor light sources of the lighting apparatus according to various embodiments can be controlled and operated centrally by a common electronic unit. Moreover, the components of the electronic unit, if appropriate together with the semiconductor light sources of the lighting apparatus according to various embodiments, may be arranged on a mounting circuit board. Furthermore, the heat generated by the electronic unit may likewise be dissipated to the surroundings via the heat sink.

The carrier element of the lighting apparatus according to various embodiments preferably consists of thermally conductive material, for example of metal, in order that the heat generated by the luminous elements of the first and second groups of luminous elements may be dissipated to the heat sink. Moreover, the carrier element is preferably itself equipped with cooling ribs in order to enable additional cooling. Furthermore, the surface of the carrier element outside the surface regions on which the luminous elements of the first and second groups of luminous elements are arranged is embodied such that it is colored black or light absorbent, in order to avoid disturbing light reflections. In the technical jargon, the carrier element is also designated "heat slug" or "cooling finger" and projects from a side of the heat sink. The carrier element is preferably embodied in a columnar fashion and rises above the aforementioned side of the heat sink in a columnar fashion. It is mechanically connected to the heat sink by screwing or welding or is shaped from the material of the heat sink. The carrier element of the lighting apparatus according to various embodiments may be embodied as hollow, in order to accommodate in the cavity electrical leads for the power supply of the first and second groups of luminous elements. Alternatively, the electrical leads and the electrical contact-connection of the first and second groups of luminous elements can be implemented on the outer surface of the carrier element.

The heat sink of the lighting apparatus according to various embodiments preferably likewise consists of thermally conductive material, for example metal, in order to achieve good heat dissipation to the surroundings. Moreover, the heat sink preferably also has cooling ribs in order to achieve good heat emission to the surrounding air.

The lighting apparatus according to various embodiments preferably has two reflector shells provided with light-reflecting surfaces, a gap being arranged between said reflector shells, wherein the light-reflecting surface of a first reflector shell faces the first group of luminous elements and the light-reflecting surface of the second reflector shell faces the second group of luminous elements, and wherein the gap between the reflector shells faces the further group of luminous elements, such that light which is emitted by the further group of luminous elements can pass through the gap. As has already been explained above, at least three different lighting functions can thereby be realized. In particular, by means of the two reflector shells with the aid of the first and second groups of luminous elements, it is possible to produce two lighting functions having very different light distributions, such as, for example, low-beam light and high-beam light of a motor vehicle, and, by means of the further group of luminous elements, it is additionally possible to produce the lighting functions of daytime running light and position light, for example. By way of example, the same semiconductor light sources of the further group of luminous elements can be used for daytime running light function and position light function, although the semiconductor light sources are operated with reduced brightness for the position light function or a smaller number of semiconductor light sources of the further group of luminous elements are switched on for the position light function than for the daytime running light function. Alternatively or additionally, the luminous elements or only a few luminous elements of the further group of luminous elements can also be used for realizing cornering light or turning light or flashing light. By virtue of the above-described arrangement of the gap between the reflector shell and the further group of luminous elements, a spatially compact construction of the lighting apparatus according to various embodiments is possible and the light distributions generated by the first, second and further groups of luminous elements do not mutually disturb one another.

In accordance with one preferred exemplary embodiment of the lighting apparatus according to various embodiments, an optical unit assigned to the further group of luminous elements is arranged in the gap. As a result, the light generated by the at least one semiconductor light source of the further group of luminous elements may be guided through the gap in a simple manner and the desired light distribution may be generated.

The lighting apparatus according to various embodiments is preferably embodied as a vehicle headlight or as part of a vehicle headlight.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawings that show, by way of illustration, specific details and embodiments in which the disclosed embodiments may be practiced.

Figure 1:
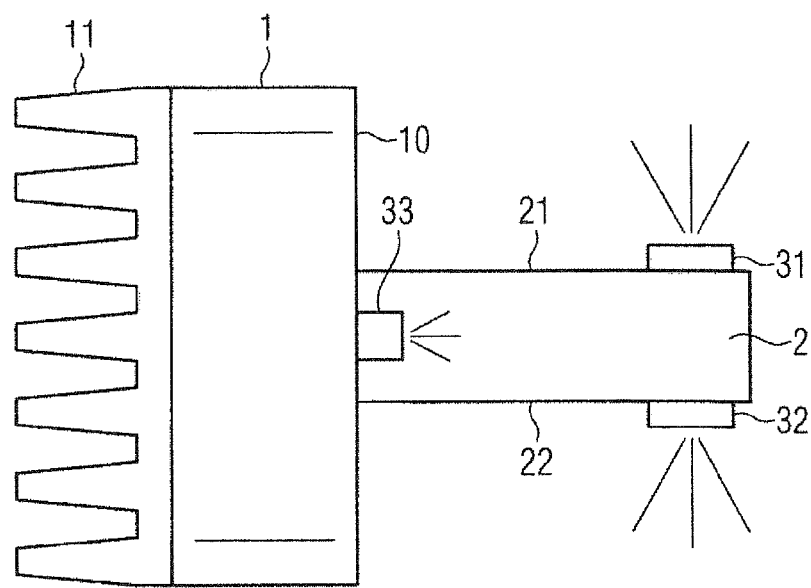
FIG. 1 shows a side view of a lighting apparatus in accordance with the first exemplary embodiment in schematic illustration.
Figure 3:
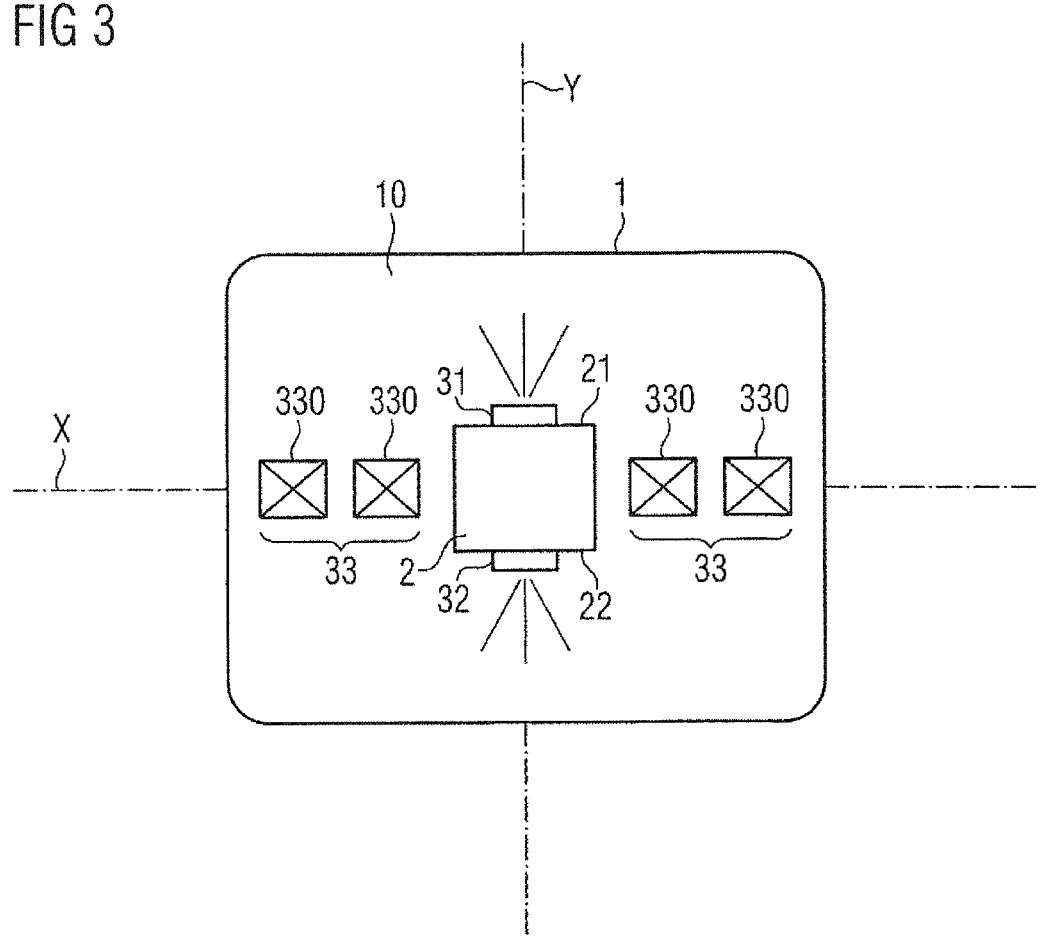
FIG. 3 shows a front view of the lighting apparatus depicted in FIG. 1 in accordance with the first exemplary embodiment in schematic illustration.

FIGS. 1 and 3 schematically illustrate the construction of the lighting apparatus in accordance with the first exemplary embodiment. This lighting apparatus has a columnar carrier element 2, which projects from a side 10 of a parallelepipedal heat sink 1, said side being designated here as the front side 10, and is connected to said heat sink. The carrier element 2 projecting from the front side 10 in a columnar fashion is equipped with a first group 31 and a second group 32 of light-emitting diodes.

The first group 31 of light-emitting diodes is used for example for generating the low-beam light and the second group 32 of light-emitting diodes is used for example for generating the high-beam light. The first group 31 and the second group 32 of light-emitting diodes are arranged on opposite sides 21 and 22 of the carrier element 2 on the surface thereof. The first group 31 and the second group 32 of light-emitting diodes in each case comprise a plurality, for example five, of light-emitting diodes which are arranged in a row on the surface of the first side 21 and respectively second side 22 of the carrier element 2 and which emit white light during operation. In the orientation illustrated in FIG. 1, the first side 21 forms the top side 21 and the second side 22 forms the underside of the carrier element 2. A further group 33 of light-emitting diodes is arranged at the front side 10 of the heat sink 1, from which the carrier element 2 projects, said further group consisting of four light-emitting diodes or light-emitting diode chips 330 arranged in a row and emitting white light during the operation thereof and being used for example for generating the daytime running light and the position light. The light-emitting diodes 330 of the further group 33 of light-emitting diodes are arranged on the front side 10 of the heat sink 1 along an axis X which runs perpendicular to the fictitious connecting axis Y of top side and underside 22 of the carrier element 2. Moreover, the light-emitting diodes 330 of the further group 33 of light-emitting diodes are arranged in a strip-shaped region on the front side 10 of the heat sink 1 which extends on both sides of the carrier element 2, to the left and right of the carrier element 2 in FIG. 3, and whose width corresponds to the transverse dimension of the carrier element 2 in the direction of the fictitious connecting axis Y. The heat sink 1 consists of metal, for example of aluminum, and is provided with cooling ribs 11 on its rear side facing away from the front side 10. The heat sink 1 has an interior, in which is accommodated an electronic unit for operating the light-emitting diodes of the first group 31, second group 32 and further group 33 of light-emitting diodes. The light-emitting diodes of the first group 31 and second group 32 of light-emitting diodes are connected to the electronic unit via an electrical lead or conductor tracks which either are fitted on the surface of the carrier element 2 or run inside the carrier element 2. The carrier element 2 likewise consists of metal, for example of aluminum, and is screwed to the heat sink 1, such that it rises from the front side 10 of the heat sink 1 in a manner similar to a column.

Figure 2:
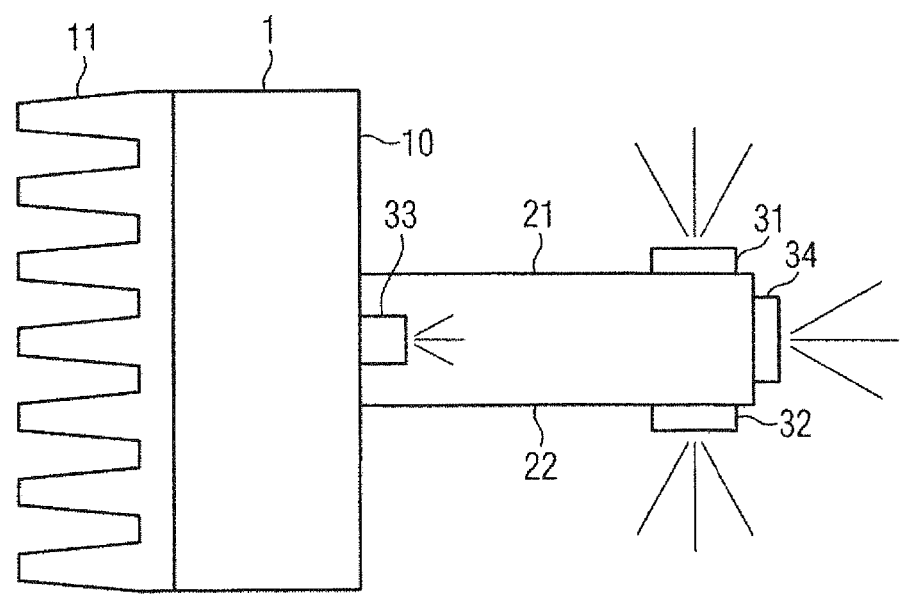
FIG. 2 shows a side view of a lighting apparatus in accordance with the second exemplary embodiment in schematic illustration.

FIG. 2 schematically illustrates the lighting apparatus in accordance with the second exemplary embodiment. This lighting apparatus is virtually identical to the lighting apparatus in accordance with the first exemplary embodiment. Therefore, in FIGS. 1, 2 and 3, the same reference signs are used for identical components of the lighting apparatuses and, for the description of these identical components, reference is made to the description of the lighting apparatus in accordance with the first exemplary embodiment. The lighting apparatus in accordance with the second exemplary embodiment differs from the lighting apparatus in accordance with the first exemplary embodiment only in an additional, third group 34 of light-emitting diodes, which is arranged on the end side 23 of the carrier element 2 of the lighting apparatus in accordance with the second exemplary embodiment. Said third group 34 of light-emitting diodes may be used for a further lighting function, for example for generating infrared beams for a night vision application. The light-emitting diodes of the third group 34 of light-emitting diodes are likewise operated by means of the electronic unit arranged in the interior of the heat sink 1. In all other details, the lighting apparatus in accordance with the second exemplary embodiment corresponds to the lighting apparatus in accordance with the first exemplary embodiment.

Figure 4:
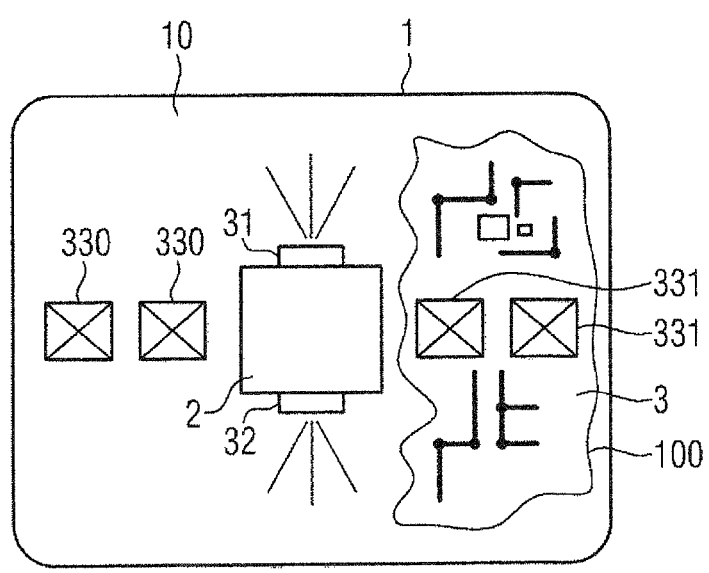
FIG. 4 shows a front view of a lighting apparatus in accordance with the third exemplary embodiment in schematic illustration.

FIG. 4 schematically illustrates the lighting apparatus in accordance with the third exemplary embodiment. This lighting apparatus is virtually identical to the lighting apparatus in accordance with the first exemplary embodiment. Therefore, in FIGS. 1, 3 and 4, the same reference signs are used for identical components of the lighting apparatuses and, for the description of these identical components, reference is made to the description of the lighting apparatus in accordance with the first exemplary embodiment. The lighting apparatus in accordance with the third exemplary embodiment differs from the lighting apparatus in accordance with the first exemplary embodiment only in the embodiment of the further group 33 of light-emitting diodes on the heat sink 1. The light-emitting diodes 330, 331 of the further group 33 of light-emitting diodes of the lighting apparatus in accordance with the third exemplary embodiment are arranged on the front side 10 of the heat sink 1 along an axis which runs perpendicular to the fictitious connecting axis of top side 21 and underside 22 of the carrier element 2. Moreover, the light-emitting diodes 330, 331 of the further group 33 of light-emitting diodes are arranged in a strip-shaped region on the front side 10 of the heat sink 1 which extends on both sides of the carrier element 2, to the left and right of the carrier element 2 in FIG. 4, and whose width corresponds to the transverse dimension of the carrier element 2 in the direction of the above-mentioned fictitious connecting axis. The light-emitting diodes 330 of the further group 33 of light-emitting diodes are fixed on the outer surface of the front side 10 of the heat sink 1, while the light-emitting diodes 331 of the further group 33 of light-emitting diodes, together with components of the electronic unit, are arranged on a circuit board 3 in the interior of the heat sink 1. The front side 10 of the heat sink 1 is provided with a perforation 100 situated opposite the light-emitting diodes 331, such that the light emission from the light-emitting diodes 331 in the direction of the front side 10 is not impeded. The light-emitting diodes 330, 331 of the further group of light-emitting diodes serve for example for generating daytime running light and position light. The perforation 100 can be covered with the aid of an optical unit, which is optically coupled to the light-emitting diodes 331.

Figure 5:
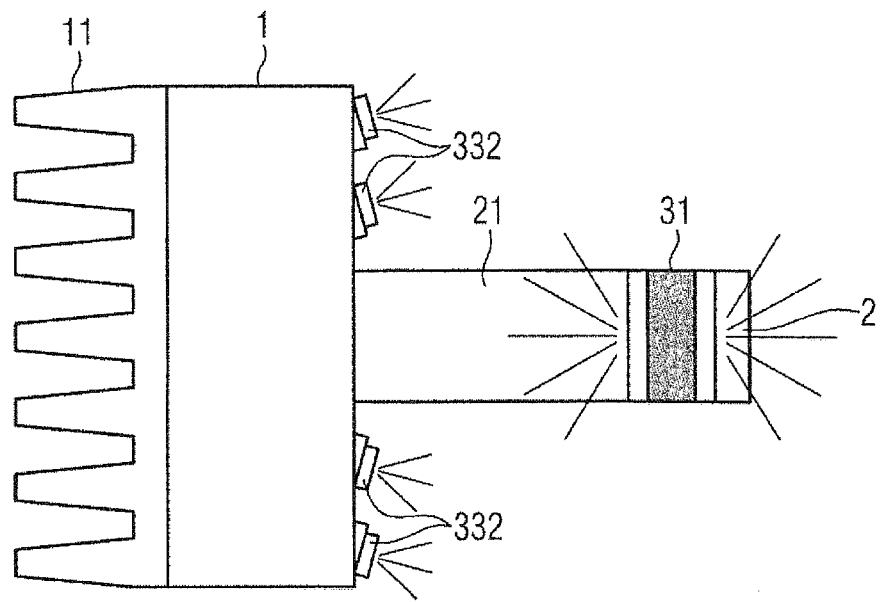
FIG. 5 shows a side view of a lighting apparatus in accordance with the fourth exemplary embodiment in schematic illustration.

FIG. 5 schematically illustrates the lighting apparatus in accordance with the fourth exemplary embodiment. This lighting apparatus is virtually identical to the lighting apparatus in accordance with the first exemplary embodiment. Therefore, in FIGS. 1, 3 and 5, the same reference signs are used for identical components of the lighting apparatuses and, for the description of these identical components, reference is made to the description of the lighting apparatus in accordance with the first exemplary embodiment. The lighting apparatus in accordance with the fourth exemplary embodiment differs from the lighting apparatus in accordance with the first exemplary embodiment only in the embodiment of the further group 33 of light-emitting diodes on the heat sink 1. The light-emitting diodes 332 of the further group 33 of light-emitting diodes of the lighting apparatus in accordance with the fourth exemplary embodiment are fixed on the outer surface on the front side 10 of the heat sink 1 in such a way that the main emission direction of the light emitted by them forms an angle of greater than zero degrees with the surface normal to the outer surface of the front side 10 of the heat sink 1 and is inclined away from the carrier element 2. By way of example, the light-emitting diodes 332 of the further group 33 of light-emitting diodes are fixed for this purpose on an inclined surface section on the front side 10 of the heat sink 1. The light-emitting diodes 332 of the further group 33 of light-emitting diodes are likewise, as illustrated for the light-emitting diodes 330 in FIG. 3, arranged on the front side 10 of the heat sink 1 along an axis X which runs perpendicular to the fictitious connecting axis Y of top side 21 and underside 22 of the carrier element 2. Moreover, the light-emitting diodes 332 of the further group 33 of light-emitting diodes are likewise arranged in a strip-shaped region on the front side 10 of the heat sink 1 which extends on both sides of the carrier element 2, to the left and right of the carrier element 2 in FIG. 3, and whose width corresponds to the transverse dimension of the carrier element 2 in the direction of the fictitious connecting axis Y. FIG. 5 shows a side view of the lighting apparatus rotated by 90 degrees about the longitudinal axis of extent of the columnar carrier element 2 in comparison with FIG. 1. The light-emitting diodes 332 of the further group 33 of light-emitting diodes of the lighting apparatus in accordance with the fourth exemplary embodiment serve for example for generating a turning light.

Figure 6:
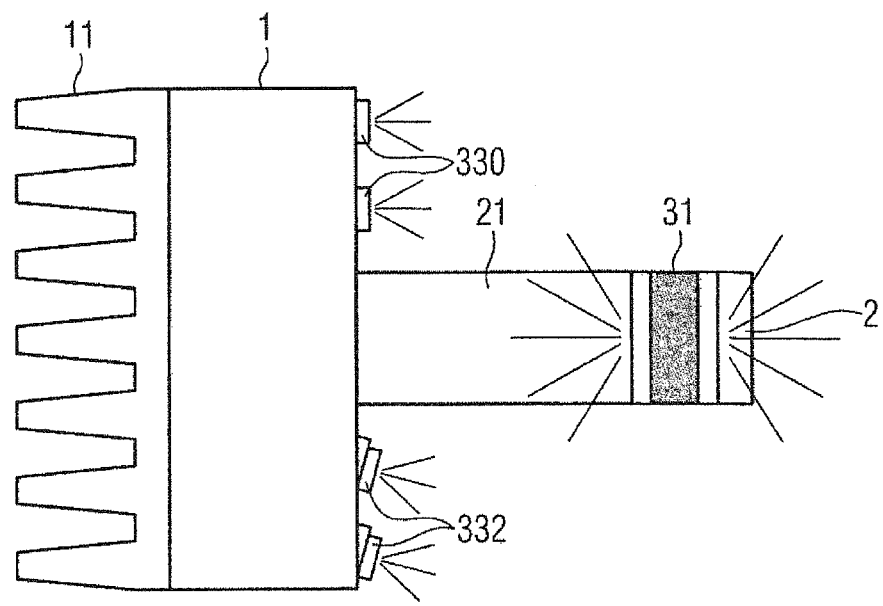
FIG. 6 shows a side view of a lighting apparatus in accordance with the fifth exemplary embodiment in schematic illustration.

FIG. 6 schematically illustrates the lighting apparatus in accordance with the fifth exemplary embodiment. This lighting apparatus is virtually identical to the lighting apparatus in accordance with the first exemplary embodiment. Therefore, in FIGS. 1, 3 and 6, the same reference signs are used for identical components of the lighting apparatuses and, for the description of these identical components, reference is made to the description of the lighting apparatus in accordance with the first exemplary embodiment. The lighting apparatus in accordance with the fifth exemplary embodiment differs from the lighting apparatus in accordance with the first exemplary embodiment only in the embodiment of the further group 33 of light-emitting diodes on the heat sink 1. In the case of the lighting apparatus in accordance with the fifth exemplary embodiment, the further group 33 of light-emitting diodes consists of two light-emitting diodes 330, which, in the same way as the corresponding light-emitting diodes 330 of the lighting apparatus in accordance with the first exemplary embodiment, are fixed on the outer surface on the front side 10 of the heat sink 1 such that the main emission direction of the light emitted by them is implemented in the direction of the longitudinal axis of extent of the columnar carrier element 2, and of two light-emitting diodes 332, which, in the same way as the corresponding light-emitting diodes 332 of the lighting apparatus in accordance with the fourth exemplary embodiment, are fixed on the outer surface on the front side 10 of the heat sink 1 such that the main emission direction of the light emitted by them is inclined away from the longitudinal axis of extent of the columnar carrier element 2. Moreover, the four light-emitting diodes 330, 332 of the further group 33 of light-emitting diodes of the lighting apparatus in accordance with the fifth exemplary embodiment are likewise arranged in a strip-shaped region on the front side 10 of the heat sink 1 which extends on both sides of the carrier element 2, as is shown in FIG. 3 for the light-emitting diodes 330 in accordance with the first exemplary embodiment, and whose width corresponds to the transverse dimension of the carrier element 2 in the direction of the fictitious connecting axis Y. During their operation, the light-emitting diodes 330 emit white light and serve for example for generating daytime running light and position light. The light-emitting diodes 332 can for example likewise be embodied as light-emitting diodes that emit white light and serve for generating a turning light or cornering light, or can alternatively be embodied as light-emitting diodes that emit orange-colored light, in order to use them for generating the flashing light for the travel direction indicator.

Figure 7:
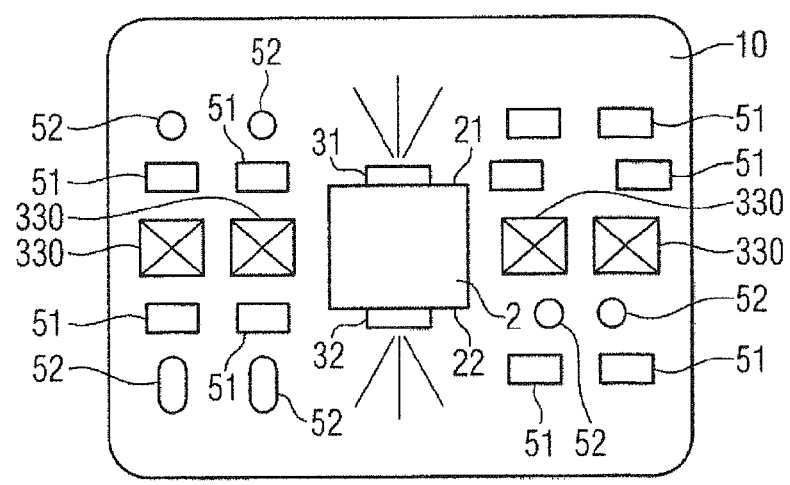
FIG. 7 shows a front view of a lighting apparatus in accordance with the sixth exemplary embodiment in schematic illustration.
Figure 8:
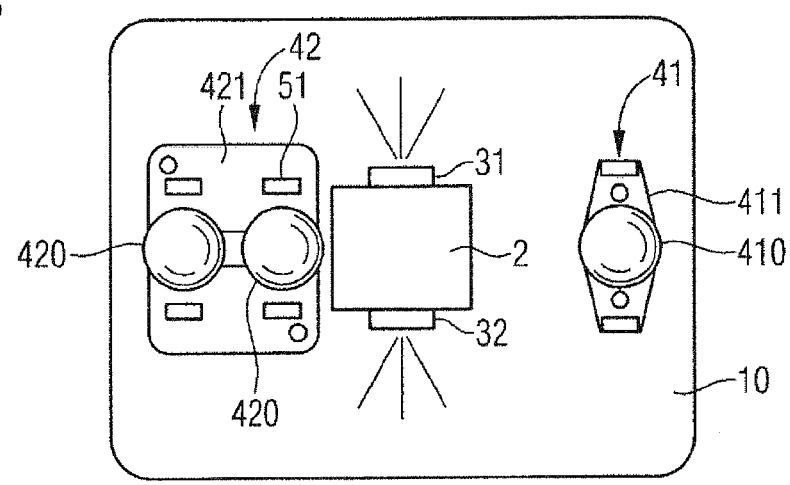
FIG. 8 shows a front view of a lighting apparatus in accordance with the sixth exemplary embodiment in schematic illustration with optical elements.
Figure 9:
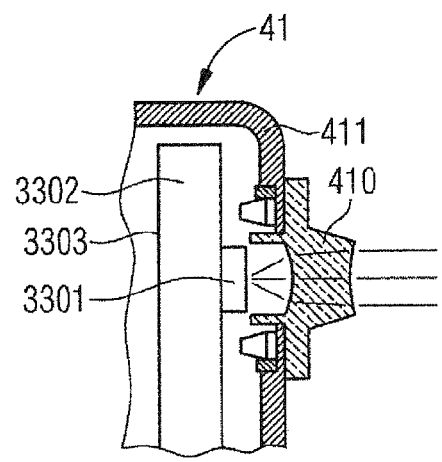
FIG. 9 shows a partly sectional, schematic illustration of an optical element and of a semiconductor light source of the lighting apparatus depicted in FIG. 8.

FIGS. 7 to 9 schematically illustrate the lighting apparatus in accordance with the sixth exemplary embodiment. This lighting apparatus is a development of the lighting apparatus depicted in FIG. 1 in accordance with the first exemplary embodiment. Therefore, in FIGS. 1, 3 and 7 to 9, the same reference signs are used for identical components of the lighting apparatuses and, for the description of these identical components, reference is made to the description of the lighting apparatus in accordance with the first exemplary embodiment. The lighting apparatus in accordance with the sixth exemplary embodiment differs from the lighting apparatus in accordance with the first exemplary embodiment only in that optical elements 41, 42 are fixed on the front side 10 of the heat sink, said optical elements being assigned to the light-emitting diodes 330 of the further group 33 of light-emitting diodes. Arranged on the front side 10 of the heat sink 1 are ribs 51, projecting from the outer surface of the front side 10, and holes 52, which serve for spatial orientation and fixing of the optical elements 41, 42. The optical elements 41, 42 are embodied in each case as a hood-like cover for the light-emitting diodes 330 with an optical lens 410, 420 arranged in the end side. The optical elements 41, 42 are fixed above the light-emitting diodes 330 on the front side 10 of the heat sink 1 with the aid of the webs 51 and holes 52 and counterparts shaped with an exact fit on the respective optical element 41 and 42. The spatial position and orientation with respect to the front side 10 of the heat sink 1 and the light-emitting diodes 330 of the further group 33 of light-emitting diodes is fixed by the shape of the webs 51 and holes 52 and of the counterparts having an exact fit on the optical element 41 and 42. FIG. 7 shows the lighting apparatus in accordance with the sixth exemplary embodiment before the mounting of the optical elements 41, 42, and FIG. 8 shows the lighting apparatus in accordance with the sixth exemplary embodiment after the mounting of the optical elements 41, 42. The optical elements 41, 42 in each case have a light-opaque hood-like housing 411, 421 having an opening in the end side, in which a light-transmissive optical lens 410, 420 is respectively arranged. The form and the imaging properties of the optical elements 41, 42 are adapted to the desired lighting function.

FIG. 9 shows a cross section through the optical element 41 and the light-emitting diode 330 arranged underneath in schematic illustration. The light-emitting diode 330 is embodied as a light-emitting diode chip 3301, for example, which is arranged on a metal-core circuit board 3302, that is to say on a ceramic circuit board having an integrated metal core. The underside 3303 of the metal-core circuit board 3302 facing away from the light-emitting diode chip 3301 is fixed on the outer surface of the front side 10 of the heat sink 1 by means of adhesive. For the spatial orientation and alignment of the light-emitting diode 330 with respect to the carrier element 2 and the optical elements 41, 42 and the heat sink 1, it is likewise possible to use the webs 51 and holes 22 or, if appropriate, additional reference means. By means of the abovementioned webs 51 and holes 52 and, if appropriate, further reference means, it is ensured that the optical lens 410 of the optical element 41 is positioned directly above the light-emitting diode chip 3301 after the mounting of said optical lens on the front side 10 of the heat sink 1. Furthermore, it is also possible to provide spacers between the optical element 41 or the optical lens 410 and the light-emitting diode chip 3301, in order to ensure a minimum distance between the abovementioned components 410, 3201. The light emitted by the light-emitting diode chip 3301 is coupled into the optical lens 410. The light-emitting diodes 330 of the further group 33 of light-emitting diodes can be used together with the optical elements 410, 420 for example for generating the daytime running light and position light.

Figure 10:
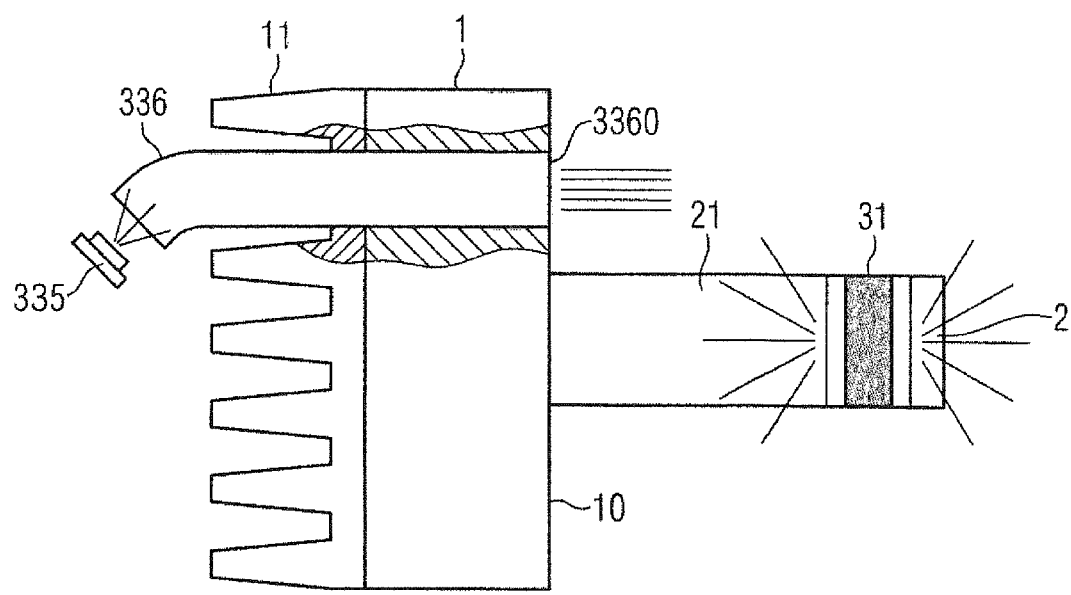
FIG. 10 shows a side view of a lighting apparatus in accordance with the seventh exemplary embodiment in schematic illustration.

FIG. 10 schematically illustrates the lighting apparatus in accordance with the seventh exemplary embodiment. This lighting apparatus is virtually identical to the lighting apparatus in accordance with the first exemplary embodiment. Therefore, in FIGS. 1, 3 and 10, the same reference signs are used for identical components of the lighting apparatuses and, for the description of these identical components, reference is made to the description of the lighting apparatus in accordance with the first exemplary embodiment. The lighting apparatus in accordance with the seventh exemplary embodiment differs from the lighting apparatus in accordance with the first exemplary embodiment only in the embodiment of the further group 33 of luminous elements on the heat sink 1. In the case of the lighting apparatus in accordance with the seventh exemplary embodiment, the luminous elements of the further group 33 of luminous elements are formed in each case by a combination of a light-emitting diode 335 with an assigned optical waveguide 336. The light-emitting diode 335 is arranged outside the heat sink 1 and the light emitted by said diode is coupled into the optical waveguide 336. The optical waveguide 336 is led through the heat sink 1, such that its light-emitting end 3360 extends into a perforation in the front side 10 of the heat sink 1.

Figure 11:
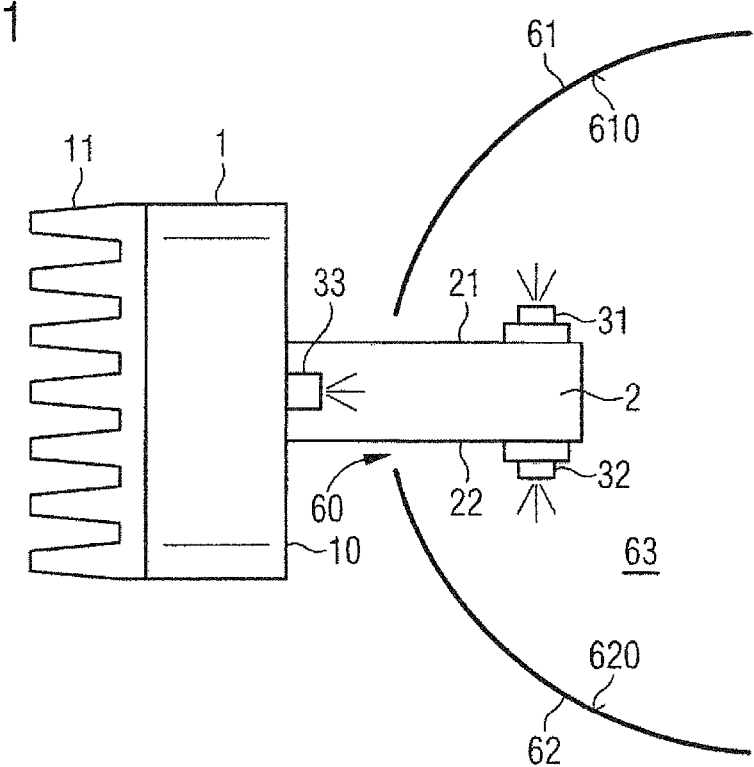
FIG. 11 shows a side view of a lighting apparatus in accordance with the eighth exemplary embodiment in schematic illustration.
Figure 12:
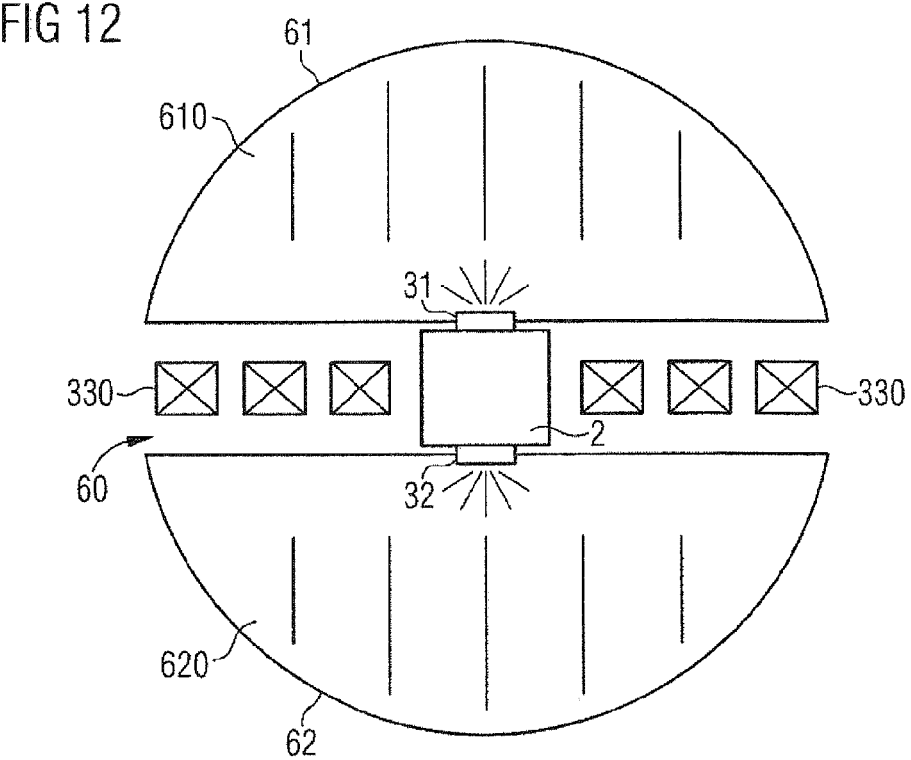
FIG. 12 shows a front view of the lighting apparatus depicted in FIG. 11 in accordance with the eighth exemplary embodiment in schematic illustration.

FIGS. 11 and 12 schematically illustrate the lighting apparatus in accordance with the eighth exemplary embodiment. This lighting apparatus is a development of the lighting apparatus depicted in FIG. 1 in accordance with the first exemplary embodiment. Therefore, in FIGS. 1, 3 and 11, the same reference signs are used for identical components of the lighting apparatuses and, for the description of these identical components, reference is made to the description of the lighting apparatus in accordance with the first exemplary embodiment. The lighting apparatus in accordance with the eighth exemplary embodiment differs from the lighting apparatus in accordance with the first exemplary embodiment only in that the lighting apparatus in accordance with the eighth exemplary embodiment has, in addition to the components of the lighting apparatus in accordance with the first exemplary embodiment, a reflector having two reflector shells 61, 62, which are separated from one another by a gap 60. The carrier element 2 projects through the gap 60 between the two reflector shells 61, 62 into the interior 63 formed by the reflector shells 61, 62, and is oriented in such a way that the first group 31 of light-emitting diodes faces the light-reflecting surface 610 of the first reflector shell 61 and the second group 32 of light-emitting diodes faces the light-reflecting surface 620 of the second reflector shell 62. The light-reflecting surfaces 610, 620 form the inner side of the reflector or of the reflector shells 61, 62. By virtue of the arrangement of the first group and second group 32 of light-emitting diodes on opposite sides 21, 22 of the carrier element 2 and the above-mentioned orientation of the carrier element 2 in the reflector, the light emitted by the first group 31 of light-emitting diodes is reflected only by the first reflector shell 61 and the light emitted by the second group 32 of light-emitting diodes is reflected only by the second reflector shell 62. Therefore, the contours of first reflector shell 61 and second reflector shell 62 can be configured differently in order to adapt them to different light distributions. By way of example, the low-beam light of a motor vehicle can be generated by means of the first group 31 of light-emitting diodes and the first reflector shell and the high-beam light for the motor vehicle can be generated by means of the second group 32 of light-emitting diodes and the second reflector shell 62. The heat sink 1 of the lighting apparatus is situated outside the interior 63 formed by the reflector shells 61, 62. The front side 10 of the heat sink 1 is arranged at a small distance from the reflector shells 61, 62 or bears on the outer side of the reflector shells 61, 62. Since the further group 33 of light-emitting diodes on the front side 10 of the heat sink 1 has the orientation depicted in FIG. 3 along the axis X, running perpendicular to the fictitious connecting axis Y of the sides 21, 22, with respect to the carrier element 2 and the groups 31, 32 of light-emitting diodes fixed thereon, the gap 60 between the reflector shells 61, 62 is arranged opposite the further group 33 of light-emitting diodes, such that the light emitted by the further group 33 of light-emitting diodes can pass through the gap 60. FIG. 12 shows a front view of the lighting apparatus depicted in FIG. 11. The further group 33 of light-emitting diodes, which here consists of six light-emitting diodes 330, is arranged, in the illustration in accordance with FIG. 12, either in the gap 60 between the reflector shells 61, 62 or directly behind the gap 60. The further group 33 of light-emitting diodes can be used for example for generating the daytime running light or position light. An optical unit can be arranged in the gap 60, into which optical unit the light emitted by the further group 33 of light-emitting diodes is coupled, as is described for example in the following exemplary embodiment and is shown in FIG. 13.

Figure 13:
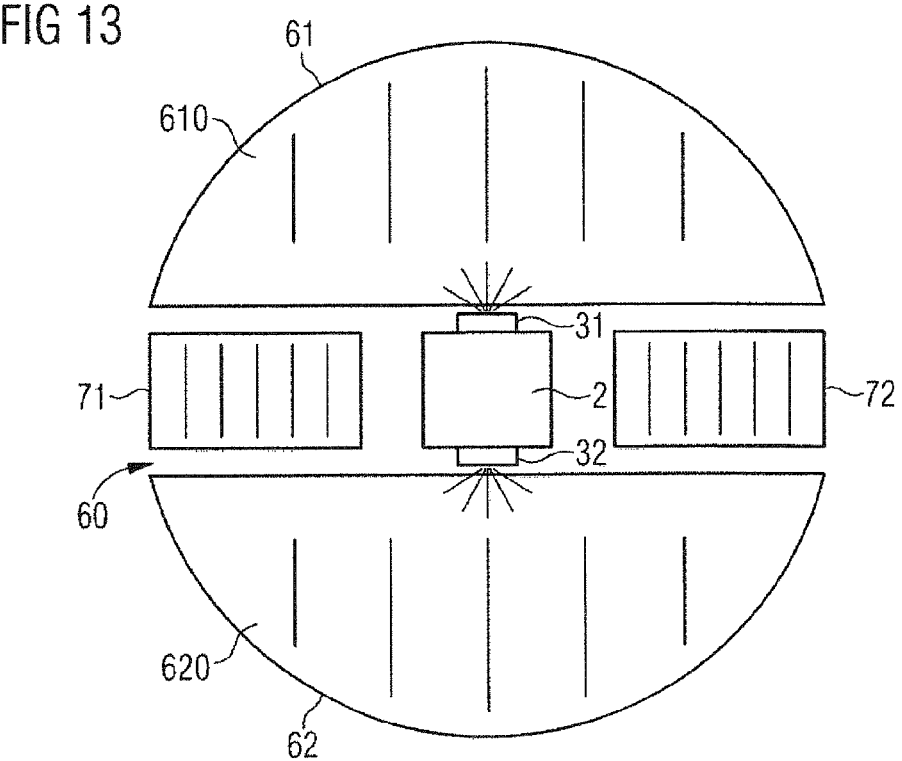
FIG. 13 shows a front view of a lighting apparatus in accordance with the ninth exemplary embodiment in schematic illustration.

FIG. 13 schematically illustrates the lighting apparatus in accordance with the ninth exemplary embodiment. This lighting apparatus is a development of the lighting apparatus depicted in FIGS. 11 and 12 in accordance with the eighth exemplary embodiment. Therefore, in FIGS. 1, 3, 11, 12 and 13, the same reference signs are used for identical components of the lighting apparatuses and, for the description of these identical components, reference is made to the description of the lighting apparatus in accordance with the eighth exemplary embodiment. The lighting apparatus in accordance with the ninth exemplary embodiment differs from the lighting apparatus in accordance with the eighth exemplary embodiment only in that optical waveguides 71, 72 are inserted in the gap 60 between the reflector shells 61, 62 on both sides of the carrier element 2, the light emitted by the light-emitting diodes 330 of the further group 33 of light-emitting diodes being coupled into said optical waveguides.

Figure 14:
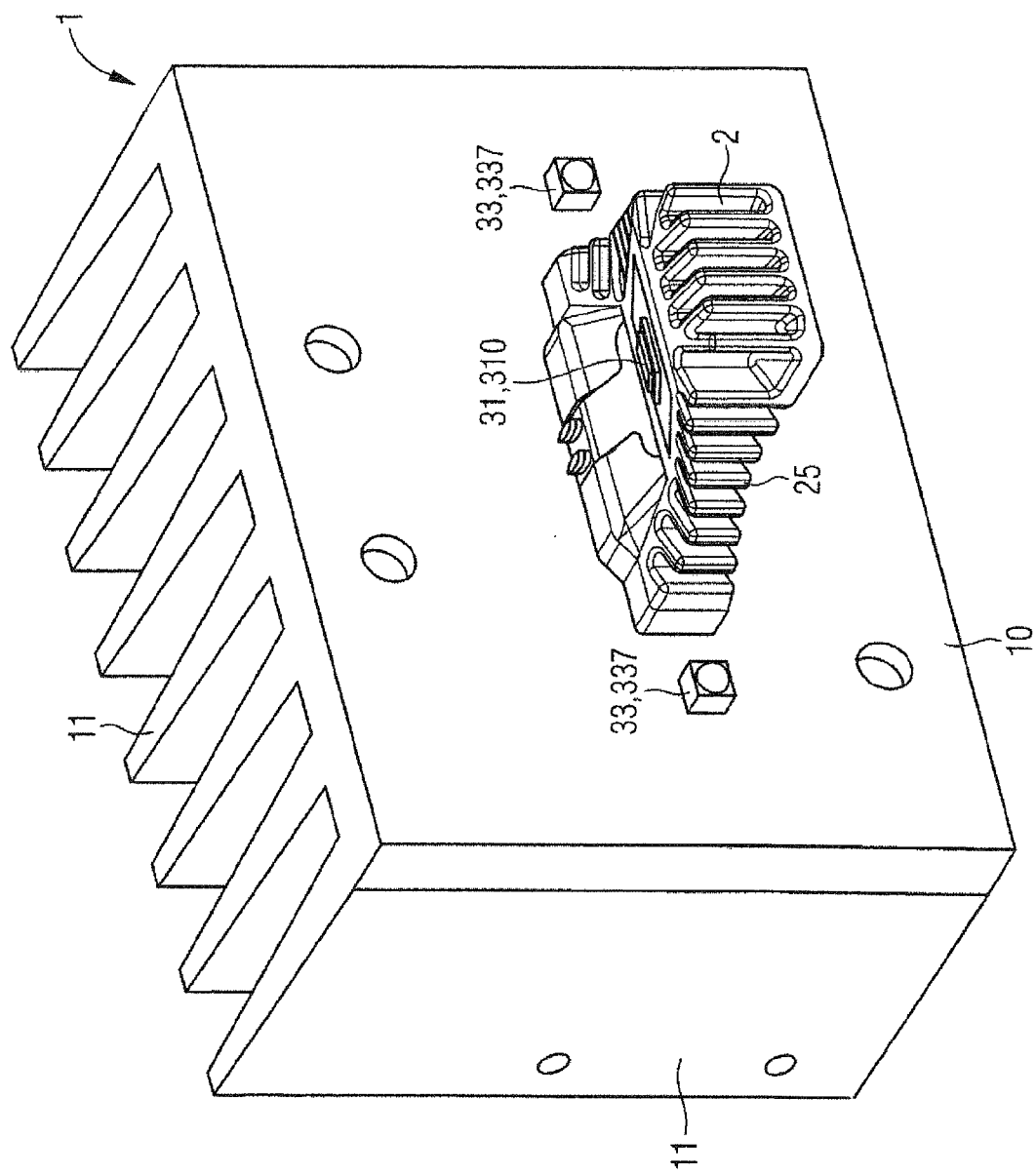
FIG. 14 shows a plan view of a lighting apparatus in accordance with the tenth exemplary embodiment.
Figure 15:
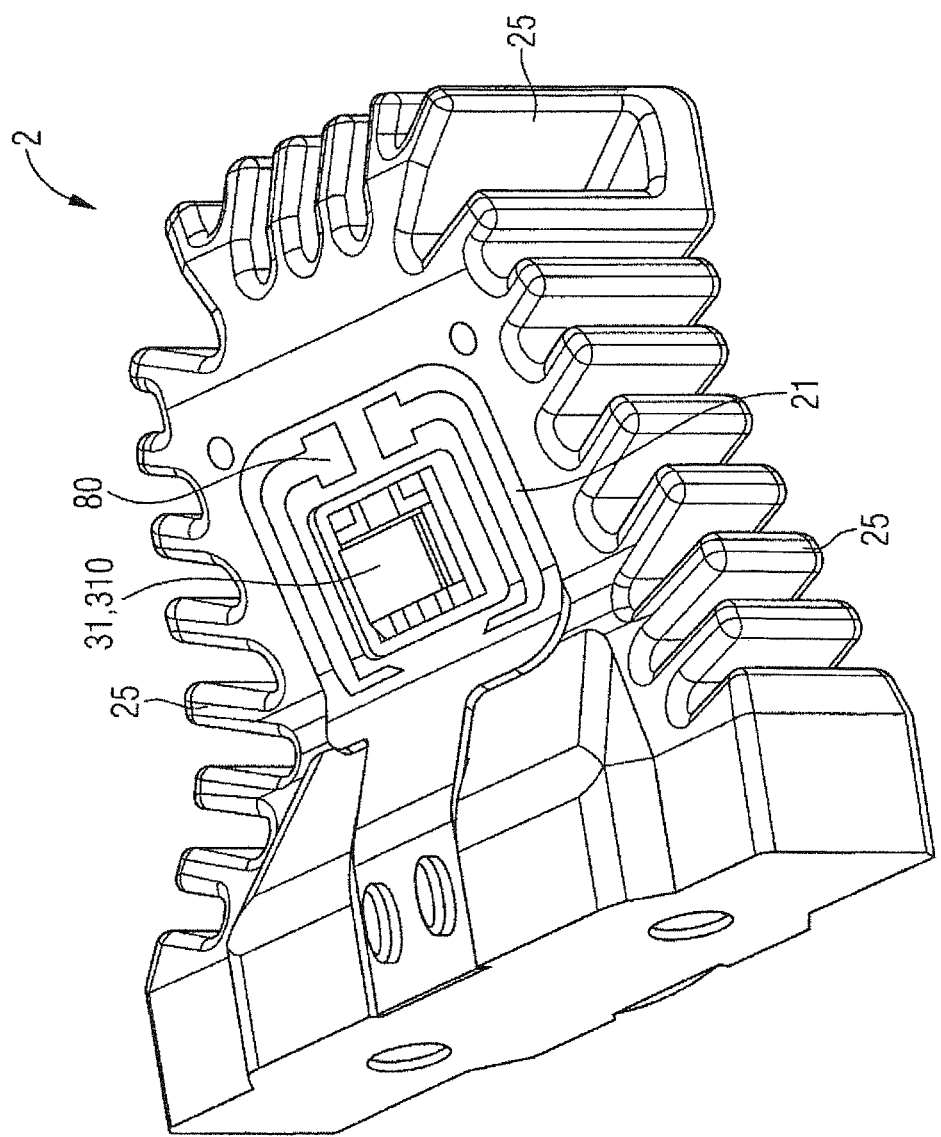
FIG. 15 shows a plan view of the carrier element of the lighting apparatus depicted in FIG. 16.

FIGS. 14 and 15 schematically illustrate the lighting apparatus in accordance with the tenth exemplary embodiment. This lighting apparatus is substantially identical to the lighting apparatus in accordance with the first exemplary embodiment. Therefore, in FIGS. 1, 3, 14 and 15, the same reference signs are used for identical components of the lighting apparatuses and, for the description of these identical components, reference is made to the description of the lighting apparatus in accordance with the first exemplary embodiment. The lighting apparatus in accordance with the tenth exemplary embodiment differs from the lighting apparatus in accordance with the first exemplary embodiment only in that, in the case of the lighting apparatus in accordance with the tenth exemplary embodiment, the further group 33 of light-emitting diodes comprises only two light-emitting diodes 337 instead of four light-emitting diodes 330. Moreover, in FIGS. 14 and 15 the form of the carrier element 2 and the arrangement of the first group of light-emitting diodes are depicted more precisely and less schematically than in FIGS. 1 and 3. The light-emitting diodes 337 of the further group are light-emitting diodes from OSRAM which are commercially available with the brand name OSLON. The carrier element 2 is screwed to the front side 10 of the parallelepipedal heat sink 1. The carrier element 2 in accordance with the tenth exemplary embodiment as depicted in FIGS. 14 and 15 is equipped with cooling ribs 25 arranged on the end side and the lateral edges of the carrier element 2. The first group 31 of light-emitting diodes, which is arranged on the top side 21 of the carrier element 2, is formed by a light-emitting diode chip 310 arranged on a metal-core circuit board, which is in turn fixed on the top side 21 on the surface of the carrier element 2. Electrical conductor tracks 80 for making electrical contact with the light-emitting diode chip 310 run on the surface on the top side 21 of the carrier element 2. The second group 32 of light-emitting diodes, which is arranged on the underside 22 of the carrier element 2, said underside not being visible in FIGS. 14 and 15, is likewise formed by a light-emitting diode chip, which is identical to the light-emitting diode chip 310.

Figure 16:
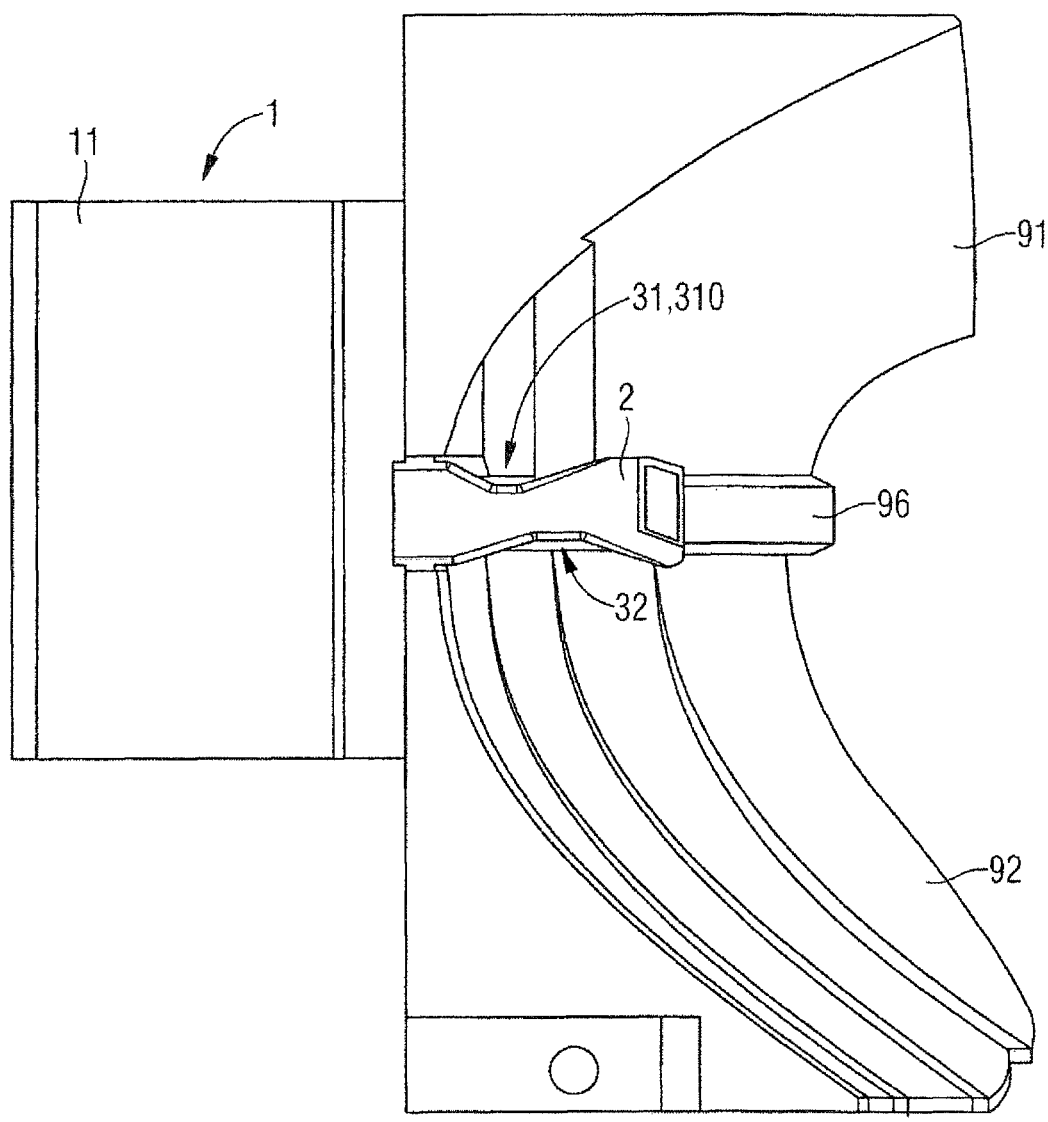
FIG. 16 shows a side view of a lighting apparatus in accordance with the eleventh exemplary embodiment in partly sectional illustration.
Figure 17:
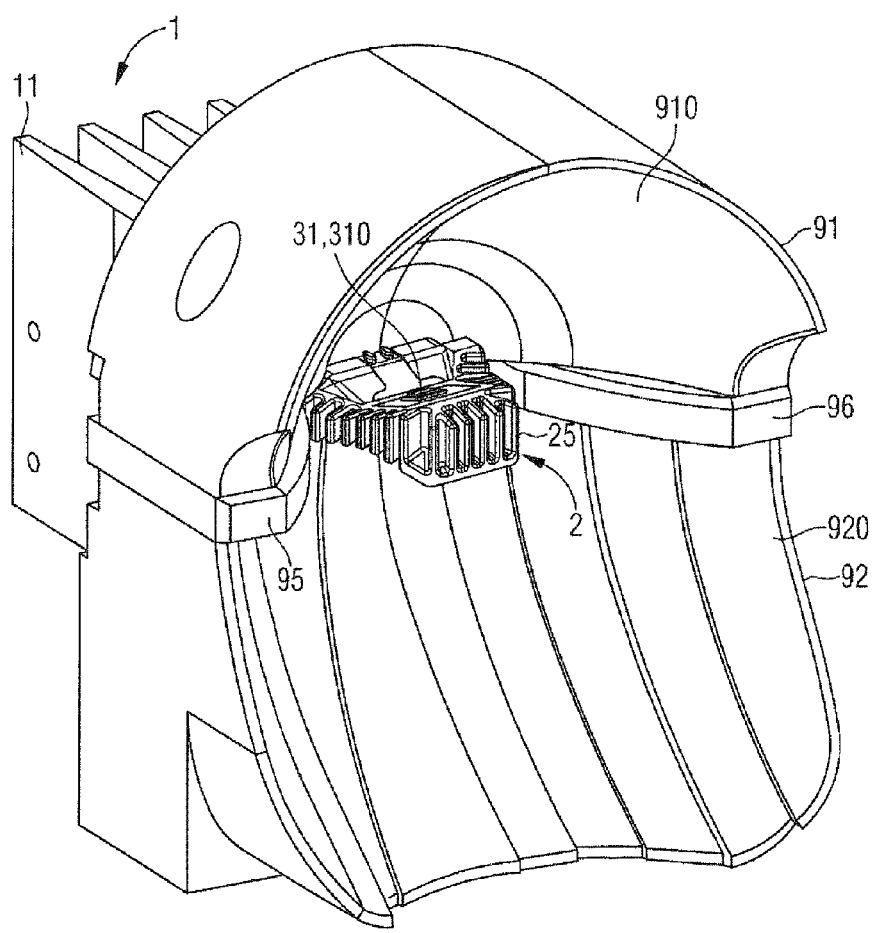
FIG. 17 shows a front view of the lighting apparatus depicted in FIG. 16 in accordance with the eleventh exemplary embodiment.
Figure 18:
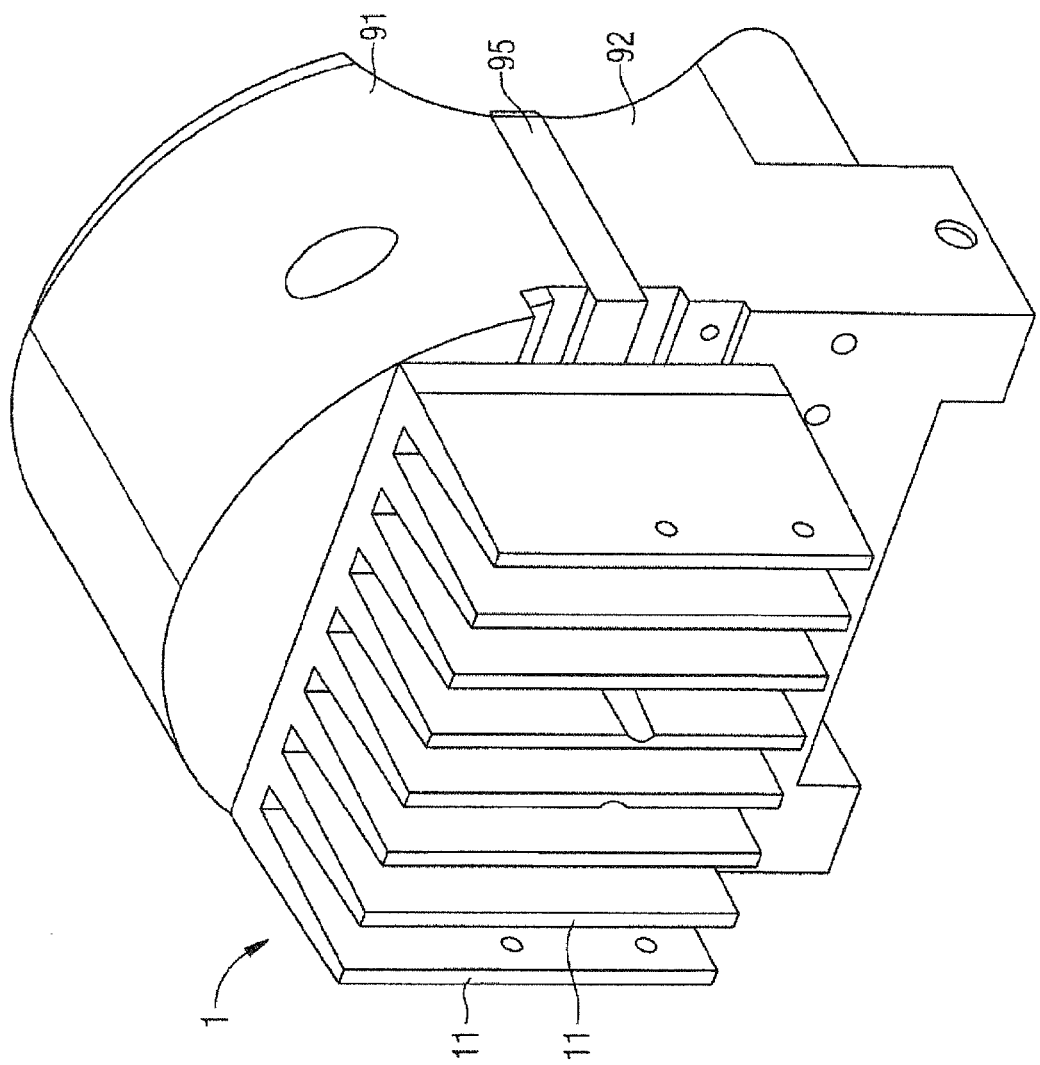
FIG. 18 shows a rear view of the lighting apparatus depicted in FIGS. 16 and 17 in accordance with the eleventh exemplary embodiment.

FIGS. 16 to 18 schematically illustrate the lighting apparatus in accordance with the eleventh exemplary embodiment. This lighting apparatus is a development of the lighting apparatus depicted in FIGS. 14 and 15 in accordance with the tenth exemplary embodiment. Therefore, in FIGS. 1, 3 and 14 and 18, the same reference signs are used for identical components of the lighting apparatuses and, for the description of these identical components, reference is made to the description of the lighting apparatus in accordance with the tenth exemplary embodiment. The lighting apparatus in accordance with the eleventh exemplary embodiment also comprises, in addition to the components of the lighting apparatus in accordance with the tenth exemplary embodiment, a reflector having a first reflector shell 91 and a second reflector shell 92 and two optical waveguides 95, 96, which are arranged in a gap between the reflector shells 91, 92 on both sides of the carrier element 2. The carrier element 2 projects through the gap between the two reflector shells 91, 92 into the interior formed by the reflector shells 91, 92, and is oriented in such a way that the light-emitting diode chip 310 of the first group 31 of light-emitting diodes faces the light-reflecting surface 910 of the first reflector shell 91 and the light-emitting diode chip of the second group 32 of light-emitting diodes faces the light-reflecting surface 920 of the second reflector shell 92. The light-reflecting surfaces 910, 920 form the inner side of the reflector or of the reflector shells 91, 92. By virtue of the arrangement of the first group 31 and second group 32 of light-emitting diodes on opposite sides 21, 22 of the carrier element 2 and the abovementioned orientation of the carrier element 2 in the reflector, the light emitted by the first group 31 of light-emitting diodes is reflected only by the first reflector shell 91 and the light emitted by the second group 32 of light-emitting diodes is reflected only by the second reflector shell 92.

Therefore, the contours of first reflector shell 91 and second reflector shell 92 can be configured differently in order to adapt them to different light distributions. By way of example, the low-beam light of a motor vehicle can be generated by means of the first group 31 of light-emitting diodes and the first reflector shell 91 and the high-beam light for the motor vehicle can be generated by means of the second group 32 of light-emitting diodes and the second reflector shell 92. The heat sink 1 of the lighting apparatus is situated outside the interior formed by the reflector shells 91, 92. The front side 10 of the heat sink 1 bears on the outer side or rear side of the reflector shells 91, 92. Since the further group 33 of light-emitting diodes, which is formed by the light-emitting diodes 337, on the front side 10 of the heat sink 1 has the orientation depicted in FIG. 3 or 14 along the axis X, running perpendicular to the fictitious connecting axis Y of the sides 21, 22, with respect to the carrier element 2 and the groups 31, 32 of light-emitting diodes fixed thereon, the gap between the reflector shells 91, 92 is arranged opposite the further group 33 of light-emitting diodes 337, such that the light emitted by the further group 33 of light-emitting diodes can be coupled into the two optical waveguides 95, 96 arranged in the gap.

FIG. 17 shows a front view of the lighting apparatus depicted in FIG. 16. The two optical waveguides 95, 96 are fixed on both sides of the carrier element 2 in the gap between the reflector shells 91, 92 and conceal the view of the light-emitting diodes 337. With the aid of the two light-emitting diodes 337, the light from which is in each case coupled into one of the optical waveguides 95 and 96, respectively, the daytime running light and position light of the motor vehicle are generated. The changeover between daytime running light and position light is carried out by means of a for example two-stage brightness regulation of the light-emitting diodes 337 with the aid of the electronic unit accommodated in the interior of the heat sink 1. As has already been described above, an electronic unit for operating all light-emitting diodes mounted on the heat sink 1 and the carrier element 2 is situated in the interior of the heat sink 1.

The rear view in FIG. 18 of the lighting apparatus in accordance with the eleventh exemplary embodiment shows the cooling ribs 11 of the heat sink 1 and the outer side or rear side of the two reflector shells 91, 92 and of the optical waveguide 95. The heat generated by the light-emitting diodes and the electronic unit is dissipated to the surroundings via the cooling ribs 11.

While the disclosed embodiments has been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting apparatus having semiconductor light sources and a heat sink for the semiconductor light sources, wherein the lighting apparatus has a carrier element for at least one first group and one second group of luminous elements, said carrier element being connected to the heat sink and projecting from a side of the heat sink, and wherein the first group and second group of luminous elements are arranged on surface regions of the carrier element and each group of luminous elements comprises at least one semiconductor light source, wherein a further group of luminous elements is arranged at the side of the heat sink from which the carrier element projects, and the further group of luminous elements comprises at least one semiconductor light source, wherein the lighting apparatus has two reflector shells provided with light-reflecting surfaces, the light-reflecting surface of a first reflector shell facing the first group of luminous elements and the light-reflecting surface of the second reflector shell facing the second group of luminous elements, and wherein the light-reflecting surfaces face away from the heat sink, wherein the further group of luminous elements has at least one optical element which is optically coupled to the at least one semiconductor light source of the further group of luminous elements, wherein the at least one optical element is an optical waveguide, wherein a gap is arranged between said reflector shells, and wherein the gap between the reflector shells faces the further group of luminous elements, such that light which is emitted by the further group of luminous elements can pass through the gap, and wherein an optical unit assigned to the further group of luminous elements is arranged in the gap.

2. The lighting apparatus as claimed in claim 1, wherein the surface regions of the carrier element on which the first group and second group of luminous elements are arranged lie on opposite sides of the carrier element.

3. The lighting apparatus as claimed in claim 2, wherein the luminous elements of the further group of luminous elements are arranged along an axis extending perpendicular to a projected connecting axis of the opposite sides of the carrier element on whose surface regions the first group and second group of luminous elements are arranged.

4. The lighting apparatus as claimed in claim 2, wherein the luminous elements of the further group of luminous elements are arranged in a strip-shaped region which runs perpendicular to a projected connecting axis on both sides of the carrier element and whose width corresponds to the corresponding transverse dimension of the carrier element.

5. The lighting apparatus as claimed in claim 1, wherein the further group of luminous elements is arranged on a surface of the side of the heat sink from which the carrier element projects.

6. The lighting apparatus as claimed in claim 5, wherein the luminous elements of the further group of luminous elements are arranged in such a way that their main emission direction forms an angle of greater than zero degrees with the surface normal to the surface of the side of the heat sink from which the carrier element projects.

7. The lighting apparatus as claimed in claim 1, wherein luminous elements of the further group of luminous elements are arranged within the heat sink opposite or in the region of at least one perforation in a surface of the side of the heat sink from which the carrier element projects.

8. The lighting apparatus as claimed in claim 7, wherein the luminous elements of the further group of luminous elements are arranged in such a way that their main emission direction forms an angle of greater than zero degrees with the surface normal to the surface of the side of the heat sink from which the carrier element projects.

9. The lighting apparatus as claimed in claim 1, wherein the at least one optical element of the further group of luminous elements forms a cover for at least one perforation in the surface of the side of the heat sink from which the carrier element projects.

10. The lighting apparatus as claimed in claim 1, wherein an electronic unit for operating the semiconductor light sources of the first group, second group and further group of luminous elements is accommodated within the heat sink.

11. The lighting apparatus as claimed in claim 1, wherein the carrier element consists of thermally conductive material.

12. The lighting apparatus as claimed in claim 1, which is embodied as a vehicle headlight.

13. A lighting apparatus having semiconductor light sources and a heat sink for the semiconductor light sources, wherein the lighting apparatus has a carrier element for at least one first group and one second group of luminous elements, said carrier element being connected to the heat sink and projecting from a side of the heat sink, and wherein the first group and second group of luminous elements are arranged on surface regions of the carrier element and each group of luminous elements comprises at least one semiconductor light source, wherein a further group of luminous elements is arranged at the side of the heat sink from which the carrier element projects, and the further group of luminous elements comprises at least one semiconductor light source, wherein the lighting apparatus has two reflector shells provided with light-reflecting surfaces, the light-reflecting surface of a first reflector shell facing the first group of luminous elements and the light-reflecting surface of the second reflector shell facing the second group of luminous elements, and wherein the light-reflecting surfaces face away from the heat sink, wherein the further group of luminous elements has at least one optical element which is sandwiched between the edges of the two reflector shells, wherein the at least one optical element is an optical waveguide, wherein a gap is arranged between said reflector shells, and wherein the gap between the reflector shells faces the further group of luminous elements, such that light which is emitted by the further group of luminous elements can pass through the gap, wherein an optical unit assigned to the further group of luminous elements is arranged in the gap, and wherein the light-reflecting surfaces face away from the heat sink, and wherein the further group of luminous elements has at least one optical element embodied as optical waveguide which is arranged in said gap and sandwiched between the edges of the two reflector shells.

* * * * *